(12) United States Patent
Holmes

(10) Patent No.: US 12,331,844 B2
(45) Date of Patent: Jun. 17, 2025

(54) FAUCET LOCK

(71) Applicant: Larry Holmes, Fishers, IN (US)

(72) Inventor: Larry Holmes, Fishers, IN (US)

( * ) Notice: Subject to any disclaimer, the term of this patent is extended or adjusted under 35 U.S.C. 154(b) by 0 days.

(21) Appl. No.: 17/878,963

(22) Filed: Aug. 2, 2022

(65) Prior Publication Data

US 2024/0044419 A1 Feb. 8, 2024

(51) Int. Cl.
*F16K 35/14* (2006.01)
*F16K 35/10* (2006.01)

(52) U.S. Cl.
CPC .............. *F16K 35/14* (2013.01); *F16K 35/10* (2013.01); *Y10T 137/7256* (2015.04)

(58) Field of Classification Search
CPC .......... F16K 35/00; F16K 35/06; F16K 35/10; F16K 35/14; E05C 1/04; F16L 33/04; Y10T 137/7069; Y10T 137/7256
USPC .......... 70/175, 176, 177, 182, 183; 137/383, 137/385; 251/89, 90, 101–116
See application file for complete search history.

(56) References Cited

U.S. PATENT DOCUMENTS

| | | | | |
|---|---|---|---|---|
| 1,151,056 A | * | 8/1915 | Smith | B60R 25/005 137/383 |
| 1,517,224 A | * | 11/1924 | Walsh | F16K 17/205 251/103 |
| 1,673,454 A | * | 6/1928 | Hochstein | F16L 33/04 251/90 |
| 4,041,738 A | * | 8/1977 | Vann | E05B 73/0076 70/DIG. 58 |
| 5,588,316 A | * | 12/1996 | Jones | F16K 35/10 70/199 |
| 5,590,682 A | * | 1/1997 | Fischer | E03C 1/041 70/180 |
| 6,371,155 B1 | * | 4/2002 | Balocca | E03C 1/041 137/382 |
| 2010/0038903 A1 | * | 2/2010 | Linhorst | F16L 33/12 285/365 |
| 2013/0061449 A1 | * | 3/2013 | Powell | F16K 35/14 403/345 |
| 2015/0233099 A1 | * | 8/2015 | Holmes | E05C 1/04 29/428 |
| 2017/0089489 A1 | * | 3/2017 | Holmes | E05C 1/04 |
| 2019/0101227 A1 | * | 4/2019 | Cooney | F16K 35/10 |

FOREIGN PATENT DOCUMENTS

| | | | | | |
|---|---|---|---|---|---|
| DE | 549581 | C | * | 4/1932 | ............. F16K 35/10 |
| EP | 2243884 | A1 | * | 10/2010 | ............. E03C 1/041 |
| GB | 227400 | A | * | 1/1925 | ............. F16K 35/10 |
| GB | 241025 | A | * | 10/1925 | ............. F16K 35/10 |
| GB | 2570703 | A | * | 8/2019 | ............. F16K 35/10 |

* cited by examiner

*Primary Examiner* — Kenneth Rinehart
*Assistant Examiner* — Jonathan J Waddy
(74) *Attorney, Agent, or Firm* — Indiana University Maurer School of Law

(57) ABSTRACT

Systems and methods are provided herein for restraining sink and shower handles. One or more faucet handle cuffs with a flexible member inserted within fits over a one or more faucet handles. The faucet handle cuffs slide along a tether that secures the faucet handle cuffs into place, preventing the faucet handles from being rotated into an "on" position. The faucet handle cuffs are locked into place on the tether via a lock positioned on the cuffs that secures the cuffs to the serrated teeth on the tether.

18 Claims, 8 Drawing Sheets

FAUCET LOCK

TECHNICAL FIELD

The present disclosure relates to a faucet handle lock.

BACKGROUND AND SUMMARY OF THE DISCLOSURE

This section introduces aspects that may help facilitate a better understanding of the disclosure. Accordingly, these statements are to be read in this light and are not to be understood as admissions about what is or is not prior art.

Faucets control the flow of hot and cold water into sinks and bathtubs. The undesired operation of a faucet can cause a sink or bathtub to overflow. A device that prevents the handles of a faucet from being operated reduces the amount of undesired faucet use. It is with respect to these and other general considerations that a faucet lock is disclosed herein.

According to one aspect of the present disclosure, a faucet lock is provided. The faucet lock includes at least one cuff, a tether configured to secure a position of the at least one cuff relative to a faucet, and a lock positioned to secure the at least one cuff to the tether. The at least one cuff includes a flexible member configured to conform to a faucet handle.

According to another aspect of the present disclosure, a faucet lock is provided. The faucet lock includes at least one cuff, a tether configured to secure a position of the at least one cuff relative to a faucet, and a lock. The tether is positioned horizontally behind the at least one cuff. The lock is positioned to secure the at least one cuff to the tether and the lock has a lock member positioned at least one of above and below the tether.

According to another aspect of the present disclosure, a faucet lock is provided. A faucet lock includes at least one cuff, a tether configured to secure a position of the at least one cuff relative to a faucet, and a lock positioned to secure the at least one cuff to the tether. The lock has at least two lock members positioned on opposite sides of the tether.

These and various other features and advantages that characterize the system and methods described herein will be apparent from a reading of the following detailed descriptions and a review of the associated drawings. Additional features are outlined in the descriptions which follow, and in part, will be apparent from the descriptions or may be learned by practice of the technology. The benefits and features of the technology will be realized and attained by the structure, particularly pointed out in the written descriptions and claim hereof and the appended drawings.

BRIEF DESCRIPTION OF THE DRAWINGS

The previously described aspects of the disclosure will grow to be appreciated at a greater level once references to the following accompanying illustrations are expounded upon.

Figure 1:
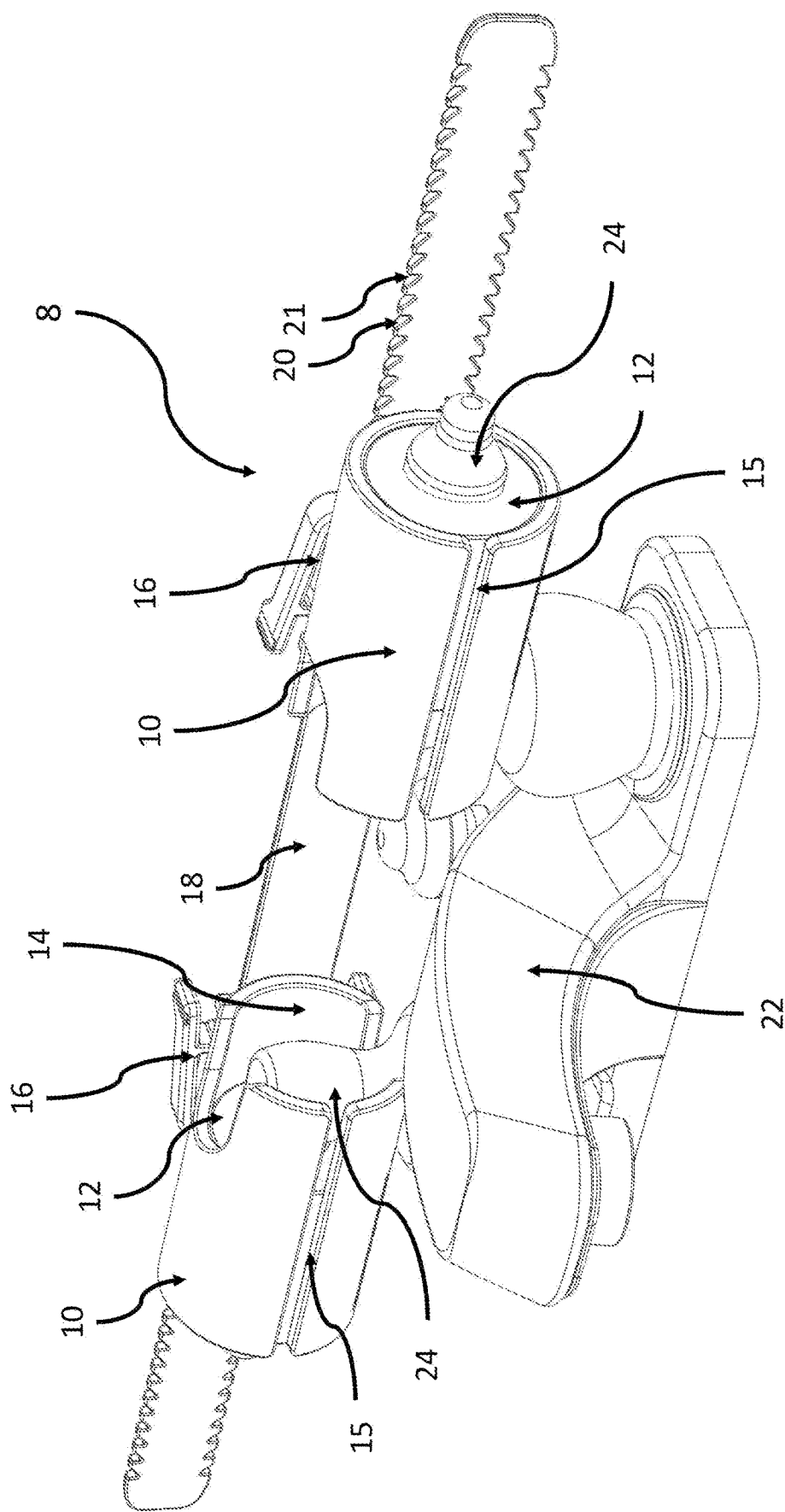
FIG. 1 is a front perspective view of a faucet lock on a faucet.

The embodiments disclosed below are not intended to be exhaustive or limit the disclosure to the precise form disclosed in the following detailed description. Rather, the embodiments are chosen and described so that others skilled in the art may utilize their teachings. Unless otherwise indicated, the components shown in the figures are shown proportional to each other. It will be understood that no limitation of the scope of the disclosure is thereby intended. The disclosure includes any alternations and further modifications in the illustrative devices and described methods and further applications of the principles of the disclosure which would normally occur to one skilled in the art to which the disclosure relates.

For the purpose of promoting an understanding of the principles of the present disclosure, reference will not be made to the embodiments illustrated in the drawings, and specific language will be sued to describe the same. It will nevertheless be understood that no limitation of the scope of this disclosure is thereby intended.

DETAILED DESCRIPTION

Figure 2:
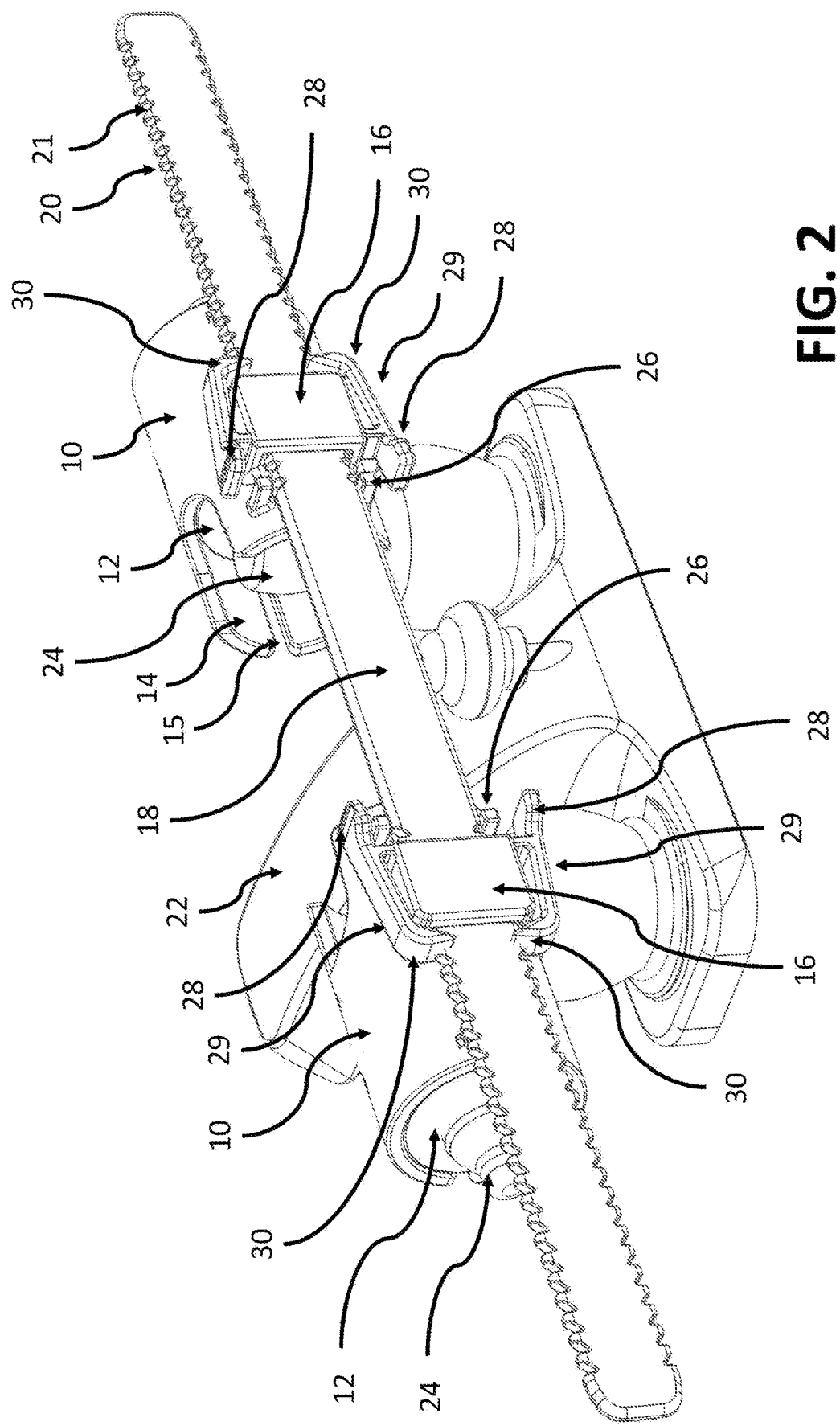
FIG. 2 is a rear perspective view of the faucet lock of FIG. 1 on the faucet.

As shown in FIGS. 1 and 2, a faucet lock 8 is shown on a sink faucet 22 to resist or block rotation of handles 24. Faucet lock 8 has two handle cuffs 10 and a serrated elongated element, sometimes referred to as a tether 18 that couples cuffs 10 together and resists or blocks handle cuffs 10 from rotating. To operate faucet 22, cuffs 10 are moved along tether 18 and removed, allowing handles 24 to rotate.

Each cuff 10 has rigid cuff body 11 having a hollow interior 14 and a gap 15, a removable filler, sometimes referred to as a flexible member 12, having a handle-receiving opening 17, and a clasp, sometimes referred to as a lock 16. Fillers 12 are made of flexible material, such as foam, rubber, etc., and fit over faucet handles 24. Cuff bodies 11 of handle cuffs 10 slide over flexible members 12 to securely hold faucet handles 24. Handle cuffs 10 are held on faucet handles 24 and secured against each other by tether 18 having teeth 20. Tether 18 allows handle cuffs 10 to be adjusted along its length to accommodate a variety of faucets 22 with handles 24. Lock 16 on handle cuff 10 interacts with tether 18 to provide resistance and reduce the likelihood of handle cuff 10 sliding off faucet handle 24. Tether 18 is positioned horizontally behind cuffs 10. According to the present disclosure, lock 16 is integral with cuff body 11 opposite of gap 15 on cuff body 11. Gap 15 does not have to be located opposite of lock 16 and could be located anywhere on cuff body 11 that allows cuff body 11 to flex and accommodate handles 24. When assembled on faucet 22, faucet lock 8 restricts faucet handles 24 from being turned.

To lock each handle cuff 10 in place, lock 16 interacts with serrated tether 18. According to the present disclosure, each lock 16 has two arms, sometimes referred to as lock members, 29, one located at the top of lock 16 and the other at the bottom of lock 16 so that lock member 29 are positioned at least one of above and below tether 18. Lock members 29 do not have to be located at the top and bottom of lock 16 and could be alternatively located on the front of lock 16 or directly on cuff body 11. Along the horizontal length of lock members 29, there is a tab, sometimes referred to as a release member, at one end and a tooth 30 at the other end. At the end of lock member 29 with tab 28, each lock 16 has a corresponding peg 26 affixed to cuff body 11 that serves to secure lock members 29 and align serrated tether 18 as it is slid into lock 16. At the other end of lock member 29 of lock 16, tooth 30 allows cuff body 11 to securely lock into tether 18. Tooth 30 is designed to snugly fit into grooves 21 created by teeth 20 on tether 18. When force is applied to handle cuff 10 in a direction that would remove handle cuff 10 from faucet handle 24, the curved design of tooth 30 will cause it to apply greater force into groove 21 of tooth 20 on tether 18, reducing unwanted removal of faucet lock 8. To disassemble faucet lock 8 from faucet 22, release members 28 of lock 16 are depressed or pinched to release teeth 30 from their interaction with tooth 20 of tether 18. Handle cuff 10 is then slid off faucet handle 24 and serrated tether 18. The other handle cuff 10 is then removed from the other faucet handle 24 in a similar manner. Alternatively, the other handle cuff 10 may remain on serrated tether 18 and removed from faucet handle 24. Upon removal of handle cuffs 12, faucet lock 8 is completely removed from faucet 22 and operation of faucet 22 is no longer restricted. According one embodiment of the present disclosure, one handle cuff is permanently affixed to a tether and another handle cuff 10 is movably affixed to the tether so that when handle cuff 10 is removed from a faucet handle, the permanently affixed handle cuff can also be removed from the other faucet handle.

Figure 3:
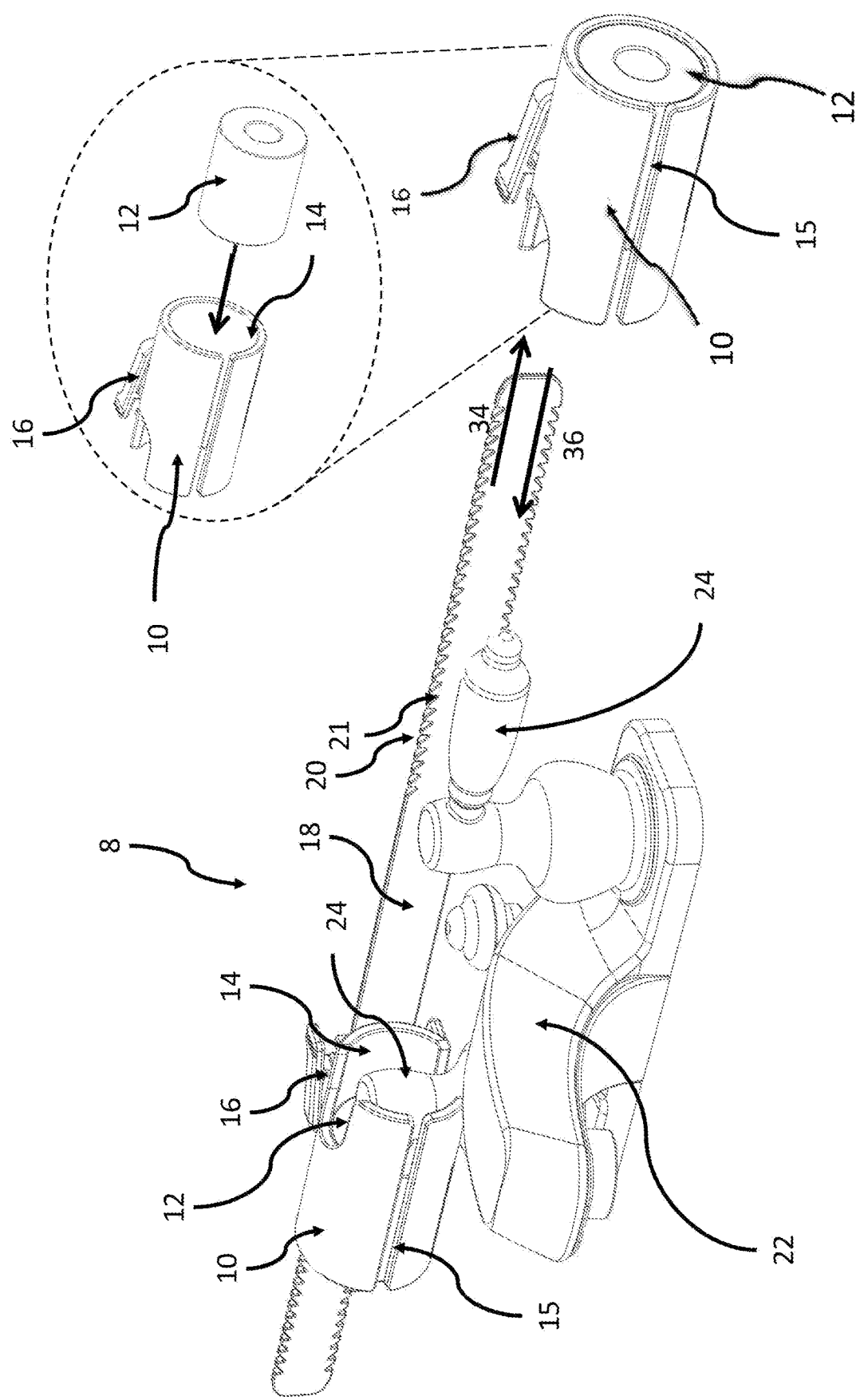
FIG. 3 is an image of the faucet lock on the faucet with a handle cuff removed from a tether, in an assembly view of the handle cuff having a flexible member or filler shown aligned for positioning in a cuff body of the handle cuff.
Figure 4:
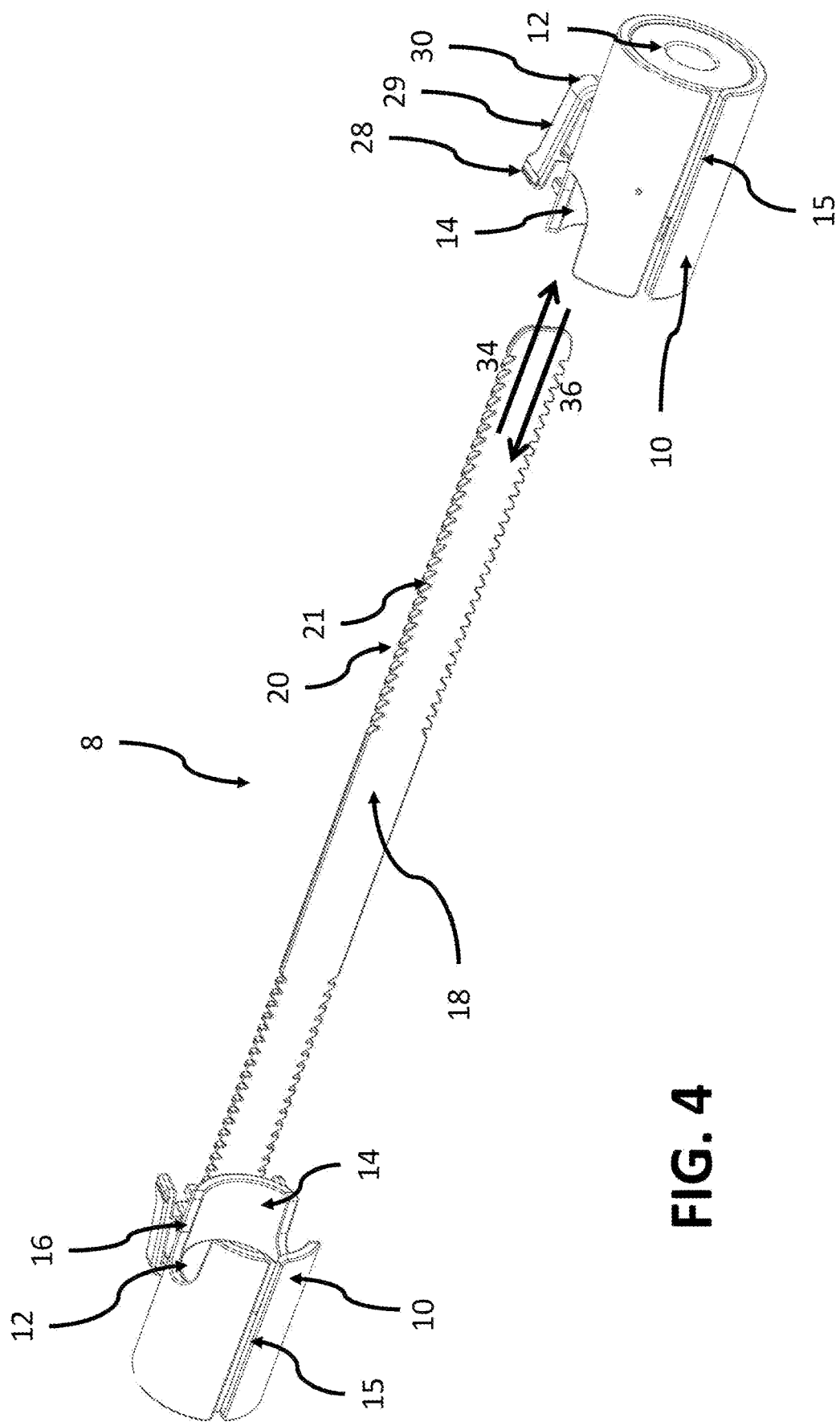
FIG. 4 is an image of the faucet lock removed from the faucet, with an assembly view of the handle cuff aligned with the tether.

In FIGS. 3 and 4, faucet lock 8 is shown on faucet 22 with one handle cuff 10 removed and exploded to show hollow interior 14 of cuff body 11 and flexible member 12. Flexible member 12 can be inserted in hollow interior 14 by moving flexible member 12 along a horizontal line, substantially parallel to hollow interior 14. According to the present disclosure, flexible member 12 is made of a flexible material configured to universally fit over handles 24 of faucet 22 and other handles with other shapes, forms, sizes, etc. Once flexible member 12 is inside handle cuff 10, handle cuff 10 can be positioned on serrated tether 18 and secured with teeth 20 of serrated tether 18. Handle cuff 10 can be removed from serrated tether 18 along line 34 or replaced along line 36.

As mentioned herein, lock 16 secures cuff body 11 onto tether 18 via the interaction between grooves 21 of teeth 20 of tether 18 and tooth 30 of locking member 29 of lock 16. Teeth 20 on tether 18 allow the position of handle cuff 10 to be adjusted to match different faucet handle configurations based on the size, spacing, position, etc. of the handles.

Figure 5:
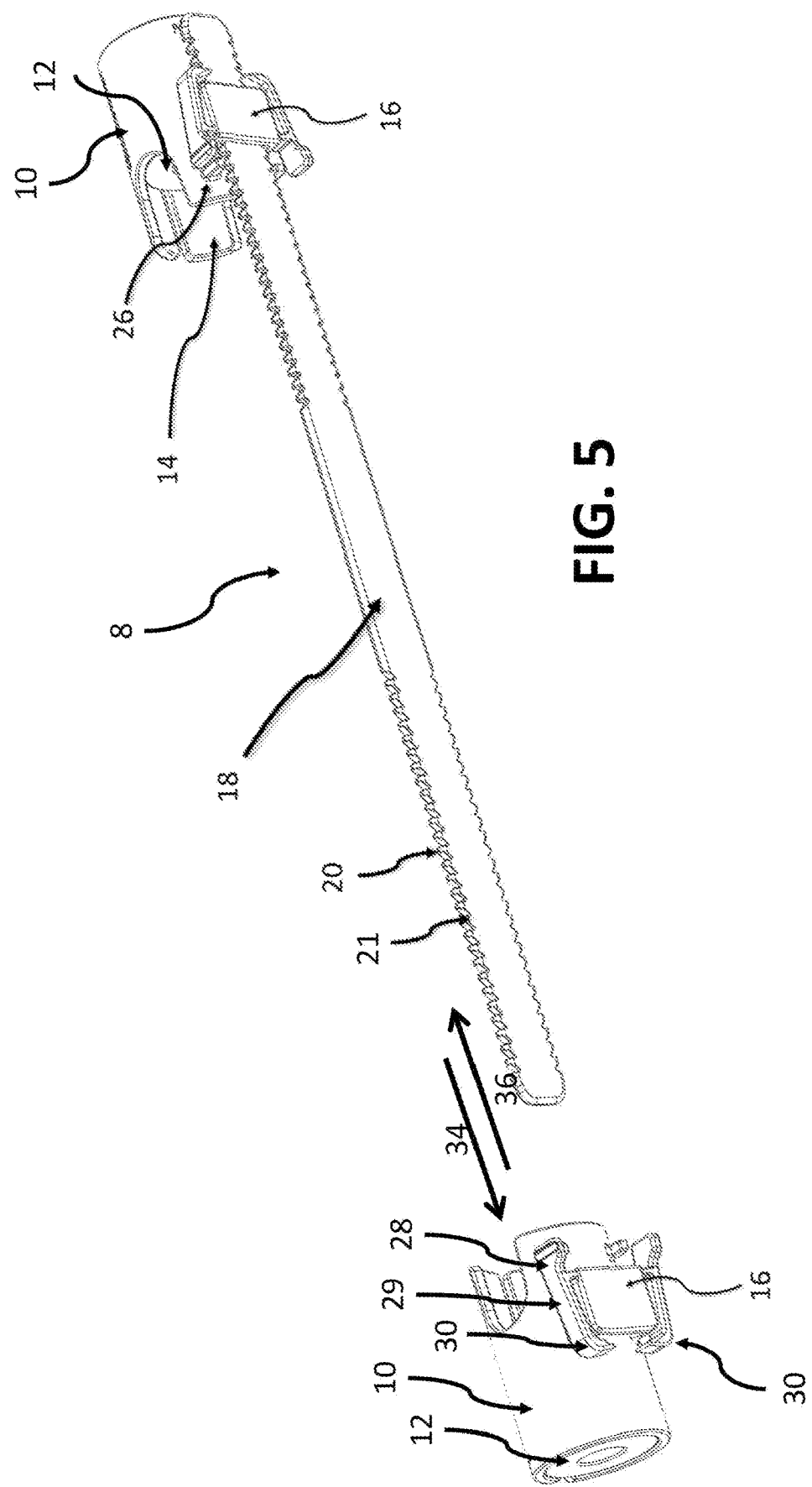
FIG. 5 is a rear perspective view of the faucet lock similar to FIG. 4.
Figure 6:
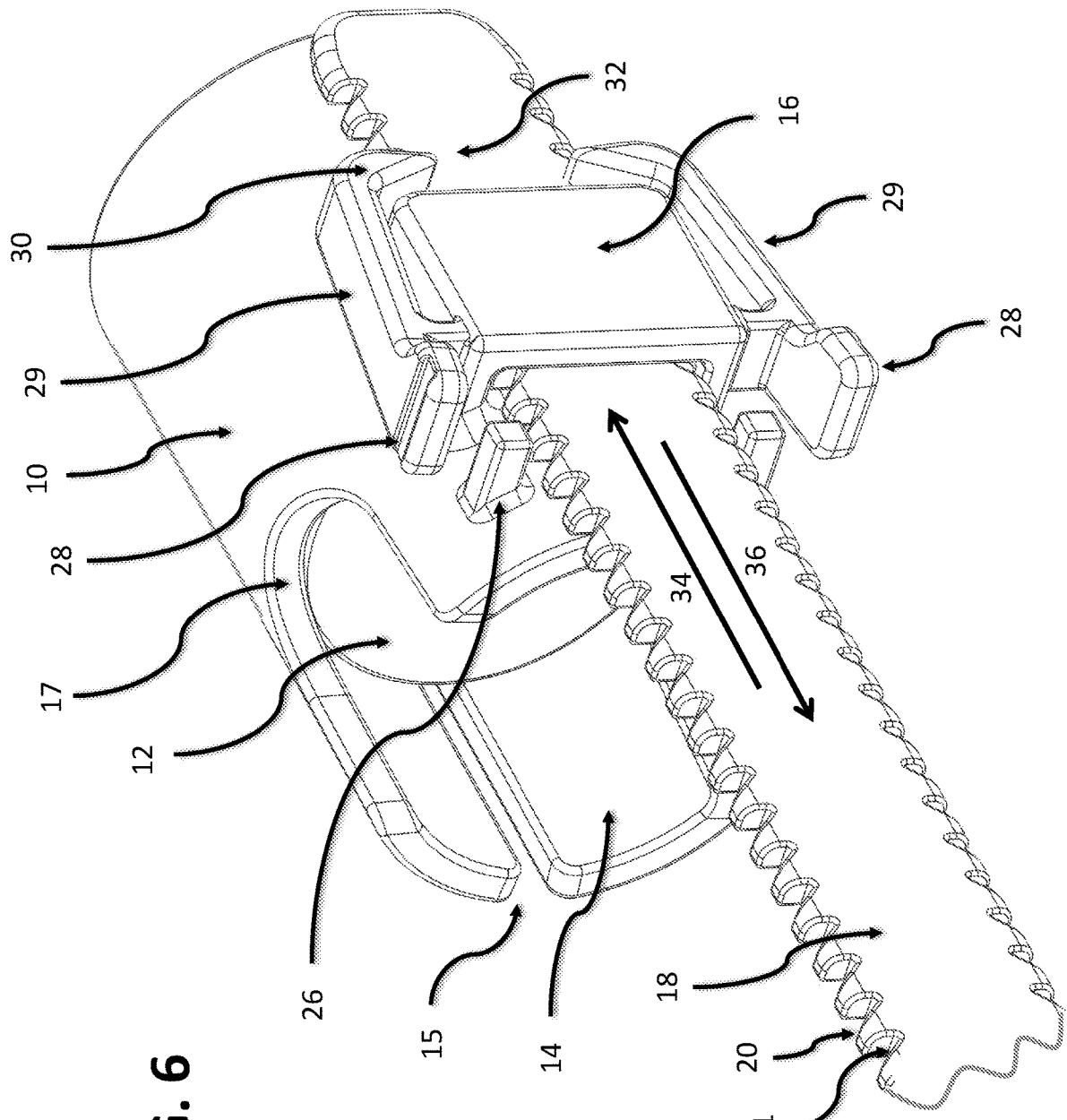
FIG. 6 is a close view of the interaction between the handle cuff and tether.

As shown in FIGS. 5 and 6, to attach tether 12, release members 28 on lock 16 are pivoted about a horizontal axis to move vertically by depressing or pinching until they stop at pegs 26. Tether 18 is then slid into lock 16 via directional motion 36 to the desired point. Release members 28 are then released, securely attaching handle cuffs 10 to tether 18 of faucet lock 8. Alternatively, cuffs 10 may be slide along tether 18 without depressing release members 28, allowing teeth 30 of locking members 29 of locks 16 to ratchet along teeth 20 of tether 12. Tether 18 includes a forward side and a rear side opposite the forward side. Release members 28 are positioned forward of the rear side of tether 18.

As shown in FIG. 6, lock 16 of handle cuff 10 interacts with tether 18 to prevent the removal of handle cuff 10 from tether 18 in directional motion 34. According to the present disclosure, tether 18 is bar-shaped and slightly curved to accommodate the cylindrical exterior of cuff body 11 of handle cuff 10 to facilitate insertion of tether 18 into lock 16. Pegs 26 facilitate insertion of tether 18 into lock 16 by acting as alignment bumpers. Pegs 26 additionally provide a stop for tab 28 when handle cuff 10 is being removed from tether 18. To attach handle cuff 10 to tether 18, tabs 28 are depressed and handle cuff 10 is slid onto tether 18 through lock 16 via directional motion 36. Once handle cuff 10 is moved along tether 18 to the desired position, tabs 28 are released and teeth 30 slide into grooves 21 created by teeth 20 on tether 18. The interaction 32 between teeth 30 on lock 16 and teeth 20 on tether 18 resists motion along direction 34 and can hinder undesired removal of handle cuff 10 from the faucet lock 8 system.

Figure 7:
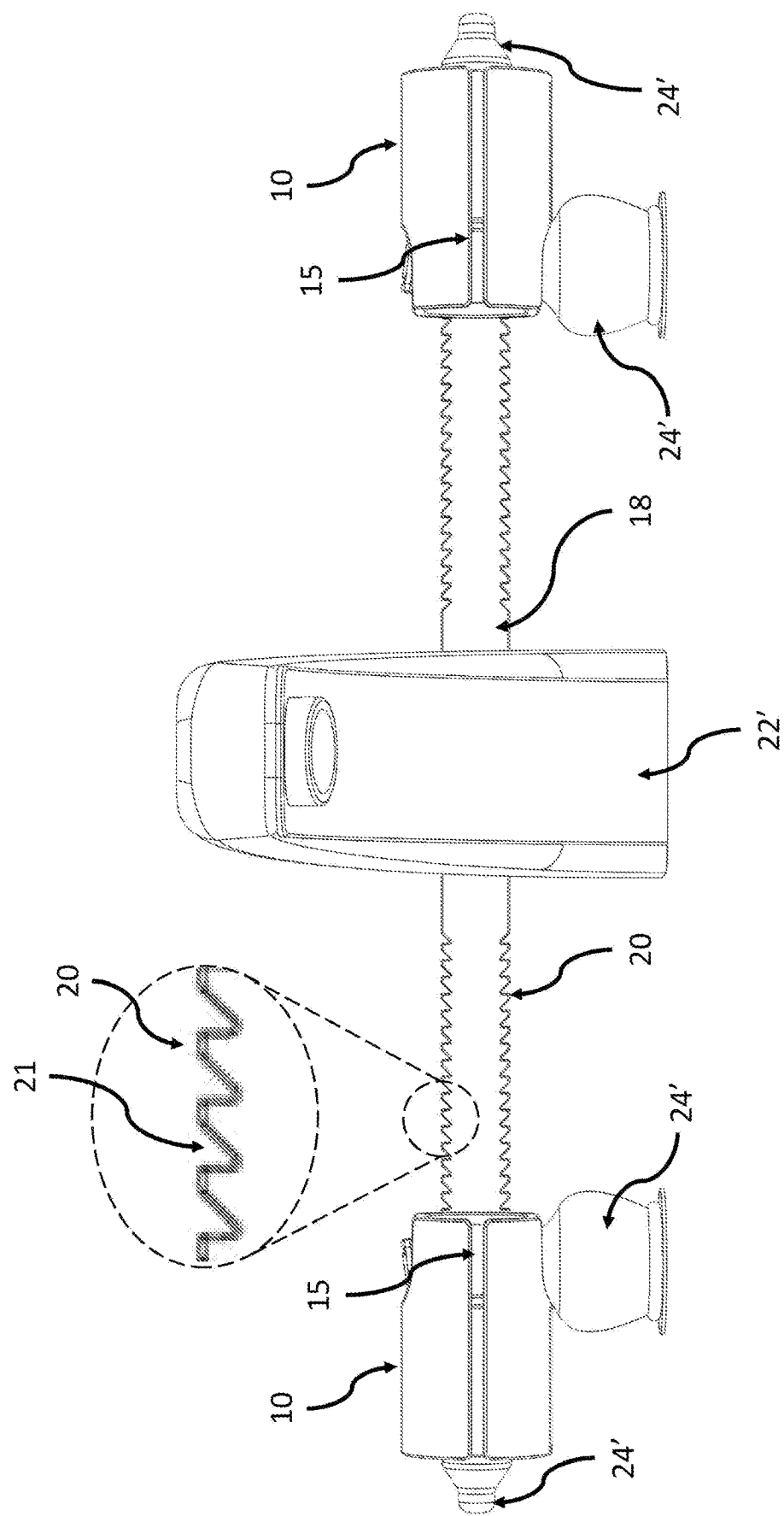
FIG. 7 is a front perspective view of the faucet lock on a shower faucet with widely spread handles with a close view of serrations of the tether.
Figure 8:
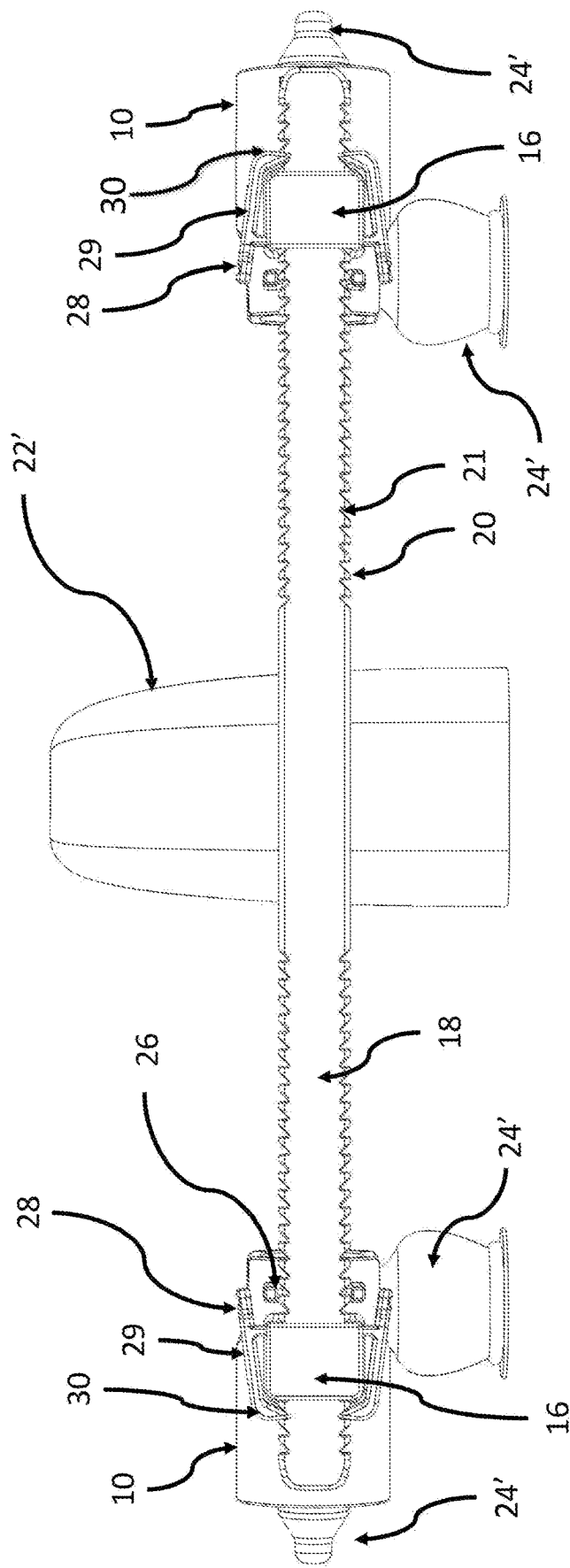
FIG. 8 is a rear perspective view of the faucet lock on the shower faucet of FIG. 7.

Tether 18 allows handle cuffs 10 to be adjusted along its length to accommodate various faucets 22. In FIGS. 7 and 8, faucet lock 8 is shown on a wide spread shower faucet 22' with widely spread handles 24'. Handle cuffs 10 have been slid onto tether 18 and secured. Since handles 24' of shower faucet 22' are spaced further apart than handles 24 of sink faucet 22, cuffs 10 are positioned further apart on tether 18. Faucet lock 8 is removed from widely spread handles 24' of shower faucet 22' in a manner substantially similar to that for sink faucet 22 discussed herein.

The invention claimed is:

1. A faucet lock including: at least two cuffs,
a tether extending between the at least two cuffs to secure a position of the at least two cuffs relative to a faucet, the tether being positioned horizontally behind the at least two cuffs,
and a lock positioned to secure at least one of the at least two cuffs to the tether, the lock having a lock member movable relative to at least one of the at least two cuffs and positioned at least one of above and below the tether.

2. The faucet lock of claim 1, wherein the tether is serrated including a plurality of teeth interacting with the lock member.

3. The faucet lock of claim 1, wherein the lock has at least two lock members positioned on opposite sides of the tether.

4. The faucet lock of claim 1, wherein the tether includes a forward side and a rear side opposite the forward side and the lock includes a release member positioned forward of the rear side of the tether.

5. The faucet lock of claim 1, wherein the lock member moves vertically between locked and unlocked positions relative to the tether.

6. A faucet lock including:
at least one cuff,
a tether configured to secure a position of the at least one cuff relative to a faucet, and
a lock positioned to secure the at least one cuff to the tether, the at least one cuff including a flexible member configured to conform to a faucet handle, the at least one cuff including a cuff body and a gap in the cuff body to allow the cuff body to flex when the flexible member receives the faucet handle, the cuff body including a pair of slots configured to receive a neck of the faucet handle, the pair of slots having a longitudinal length, the gap having a longitudinal length substantially greater than the longitudinal length of the pair of slots, the gap extending longitudinally from a first terminus of a first open end of the cuff body sized to receive the faucet handle to a second terminus of a second end of the cuff body, the second end being longitudinally spaced apart from the first open end.

7. The faucet lock of claim 6, wherein the flexible member is cylindrical.

8. The faucet lock of claim 6, wherein the at least one cuff further includes the cuff body being rigid and supporting the flexible member.

9. The faucet lock of claim 8, wherein the rigid cuff body includes an interior region, the flexible member is positioned in the interior region, and the flexible member includes a handle-receiving opening sized to receive the faucet handle.

10. The faucet lock of claim 6, wherein the tether is positioned horizontally behind the at least one cuff, and the lock has a lock member positioned at least one of above and below the tether.

11. The faucet lock of claim 10, wherein the lock has at least two lock members positioned on opposite sides of the tether.

12. The faucet lock of claim 6, wherein the pair of slots have a width, the gap has a width, and the width of the gap is substantially less than the width of the pair of slots.

13. A faucet and faucet lock assembly including:
a faucet having a faucet handle, and
a faucet lock including
at least one cuff receiving the faucet handle,
a tether configured to secure securing a position of the at least one cuff relative to the faucet, the tether having a first end and a second end longitudinally spaced apart from the first end, the tether having first and second sides extending between the first and second ends, and
a lock positioned to secure the at least one cuff to the tether to block rotation of the faucet handle, the lock having at least a first lock member positioned on the first side and a second lock member positioned opposite the first lock member on the second side, the tether being serrated including a plurality of teeth interacting with the at least two lock members.

14. The faucet and faucet lock assembly of claim 13, wherein one of the at least two lock members is positioned above the tether and at least one of the at least two lock members is positioned below the tether.

15. The faucet and faucet lock assembly of claim 13, wherein the lock includes at least two release members positioned to move the at least two lock members from locked to unlocked positions, one of the at least two release members being positioned directly below another of the at least two release members.

16. The faucet and faucet lock assembly of claim 13, wherein the lock includes a locked state with at least one of the lock members engaged with the tether to block movement of the cuff relative to the tether and an unlocked state with at least two of the lock members disengaged with the tether to permit movement of the cuff relative to the tether.

17. The faucet and faucet lock assembly of claim 13, wherein the at least two lock members pivot about horizontal axes between unlocked positions and locked positions.

18. The faucet and faucet lock assembly of claim 13, wherein the faucet includes a pair of faucet handles, the faucet lock includes a pair of cuffs receiving the faucet handles, and the tether extends between the pair of cuffs.

* * * * *